(12) United States Patent
Gelfond et al.

(10) Patent No.: US 10,855,617 B1
(45) Date of Patent: Dec. 1, 2020

(54) SYSTEM AND METHOD FOR CONTROLLING ACCESS TO RESOURCES IN A MULTICOMPUTER NETWORK

(71) Applicant: Robert Gelfond, New York, NY (US)

(72) Inventors: Robert Gelfond, New York, NY (US); Mark S. Nowotarski, Stamford, CT (US)

(73) Assignee: Robert Gelfond, New York, NY (US)

( * ) Notice: Subject to any disclaimer, the term of this patent is extended or adjusted under 35 U.S.C. 154(b) by 0 days.

(21) Appl. No.: 16/946,177

(22) Filed: Jun. 9, 2020

Related U.S. Application Data (62) Division of application No. 16/795,690, filed on Feb. 20, 2020, now Pat. No. 10,715,463.

(51) Int. Cl.
  *H04L 12/911* (2013.01)
  *H04L 29/08* (2006.01)
  *G06Q 20/12* (2012.01)

(52) U.S. Cl.
  CPC .............. *H04L 47/82* (2013.01); *H04L 67/10* (2013.01); *G06Q 20/12* (2013.01)

(58) Field of Classification Search
  CPC .......... H04L 47/82; H04L 67/10; G06Q 20/12
  See application file for complete search history.

(56) References Cited

U.S. PATENT DOCUMENTS

| | | | |
|---|---|---|---|
| 3,557,315 A * | 1/1971 | Kobus | H04Q 3/545 379/111 |
| 4,373,320 A | 2/1983 | Olivierse et al. | |
| 5,393,099 A | 2/1995 | D'Amato | |
| 5,448,731 A | 9/1995 | Wang et al. | |
| 5,557,518 A | 9/1996 | Rosen | |
| 5,797,127 A | 8/1998 | Walker et al. | |
| 5,878,141 A | 3/1999 | Daly et al. | |
| 6,035,289 A | 3/2000 | Chou et al. | |
| 6,144,948 A | 11/2000 | Walker et al. | |
| 6,772,189 B1 | 8/2004 | Asselin | |
| 6,964,049 B2 | 11/2005 | Iglesias et al. | |
| 7,373,320 B1 | 5/2008 | McDonough | |
| 7,440,926 B2 | 10/2008 | Harrington | |
| 7,686,218 B2 | 3/2010 | Hessburg et al. | |

(Continued)

FOREIGN PATENT DOCUMENTS

| | | |
|---|---|---|
| EP | 1 612 673 A1 | 4/2006 |
| JP | 2004-206273 | 7/2004 |

(Continued)

OTHER PUBLICATIONS

US 10,331,487 B2, 06/2019, Yu et al. (withdrawn)

(Continued)

*Primary Examiner* — Arvin Eskandarnia
(74) *Attorney, Agent, or Firm* — Mark Nowotarski (57) ABSTRACT

A network resource manager is configured to read in from a deferrable instance a request to transfer program data and/or execution instructions to a computer-based resource of a cloud service provider for execution. If the load on the cloud service provider is high, the manager will transmit a query to the deferrable instance offering to assign an additional deferrable instance to the original deferrable instance if both the original deferrable instance and the additional deferrable instance accept a deferral period during which neither can make requests for resources.

10 Claims, 5 Drawing Sheets

(56) References Cited

U.S. PATENT DOCUMENTS

| | | | |
|---|---|---|---|
| 7,730,489 | B1 | 6/2010 | Duvur et al. |
| 7,971,204 | B2 | 6/2011 | Jackson |
| 8,219,612 | B2 | 7/2012 | Le Scouarnec et al. |
| 8,482,830 | B2 | 7/2013 | Harris |
| 8,600,781 | B2 | 12/2013 | Butcher, III et al. |
| 8,696,448 | B2 | 4/2014 | Van Luchene |
| 8,719,825 | B2 | 5/2014 | Rajput |
| 8,856,023 | B2 | 10/2014 | Bantz et al. |
| 8,862,738 | B2 | 10/2014 | Madduri et al. |
| 8,914,511 | B1 | 12/2014 | Yemini et al. |
| 9,128,739 | B1 | 9/2015 | Juels et al. |
| 9,165,266 | B2 | 10/2015 | Boss et al. |
| 9,246,986 | B1 | 1/2016 | Ward, Jr. et al. |
| 9,276,759 | B2 | 3/2016 | Kaminsky et al. |
| 9,531,796 | B2 | 12/2016 | Desai et al. |
| 9,542,222 | B2 | 1/2017 | Mousseau et al. |
| 9,609,135 | B2 | 3/2017 | McArdle et al. |
| 9,626,210 | B2 | 4/2017 | Phillips et al. |
| 9,733,987 | B2 | 8/2017 | Herdrich et al. |
| 9,798,635 | B2 | 10/2017 | Harper et al. |
| 9,830,566 | B1 | 11/2017 | Dailianas et al. |
| 9,852,011 | B1 | 12/2017 | Yemini et al. |
| 9,886,299 | B2 | 2/2018 | Mathews et al. |
| 9,916,250 | B2 | 3/2018 | Shah et al. |
| 9,940,168 | B2 | 4/2018 | Chandra |
| 9,983,958 | B2 | 5/2018 | Bhat et al. |
| 10,026,070 | B2 | 7/2018 | Thorpe et al. |
| 10,181,143 | B2 | 1/2019 | Thanuvan et al. |
| 10,205,675 | B2 | 2/2019 | Chen et al. |
| 10,225,337 | B2 | 3/2019 | Ramachandra et al. |
| 10,257,115 | B2 | 4/2019 | Horman |
| 10,284,415 | B1 | 5/2019 | Alabsi |
| 10,572,200 | B2 | 2/2020 | Tokuchi |
| 10,592,290 | B2 | 3/2020 | Cui et al. |
| 10,606,624 | B2 | 3/2020 | Cropper et al. |
| 2001/0034687 | A1 | 10/2001 | Bushonville et al. |
| 2008/0109233 | A1 | 5/2008 | Leach et al. |
| 2008/0109321 | A1 | 5/2008 | Leach et al. |
| 2008/0109322 | A1 | 5/2008 | Leach et al. |
| 2008/0201459 | A1 | 8/2008 | Vul et al. |
| 2009/0006184 | A1 | 1/2009 | Leach et al. |
| 2009/0254971 | A1 | 10/2009 | Herz et al. |
| 2009/0307046 | A1 | 12/2009 | Taylor |
| 2010/0042456 | A1 | 2/2010 | Stinchcombe et al. |
| 2013/0073434 | A1 | 3/2013 | Gelfond |
| 2014/0297867 | A1 | 10/2014 | Ennaji et al. |
| 2016/0092264 | A1* | 3/2016 | Fontenot ............... G06F 9/4881 718/102 |
| 2017/0149863 | A1* | 5/2017 | Chitti .................... H04L 47/622 |
| 2017/0289236 | A1* | 10/2017 | Merchant ................ H04L 67/10 |
| 2018/0189100 | A1 | 7/2018 | Nemoto et al. |
| 2018/0189101 | A1 | 7/2018 | Xu et al. |

FOREIGN PATENT DOCUMENTS

| | | |
|---|---|---|
| JP | 2007-264886 | 10/2007 |
| JP | 2007-323439 | 12/2007 |
| WO | WO 2013/043900 A2 | 3/2013 |

OTHER PUBLICATIONS

PCT International Search Report and Written Opinion for PCT/US2012/056383 dated Mar. 6, 2013.
Harvard Library Office for Scholarly Communication, Digital Access to Scholarship at Harvard, Two Auction-Based Resource Allocation Environments: Design and Experience dated Feb. 20, 2008.
Barmouta and Buyya, GridBank: A Grid Accounting Services Architecture (GASA) for Distributed Systems Sharing and Integration last viewed Oct. 7, 2019.
Bitcoin Block Explorer—BTC.com last viewed Sep. 18, 2019.
Zhao, Bitcoin Mining Power Hits New High as Half a Million New ASICs Go Online, CoinDesk, https://www.coindesk.com/bitcoin-mining-power-hits-new-high-as-half-a-million-new-asics-go-online, dated Sep. 16, 2019.
Calheiros et al., Elsevier, Future Generation Computer Systems 28 (2012) 1350-1362 last viewed Oct. 21, 2019.
Caracas and Altmann, A Pricing Information Service for Grid Computing last viewed Oct. 7, 2019.
Green Circle Community, Changing default PM pricing + its effects on Planning, https://greencircle.vmturbo.com/thread/1551, last viewed Oct. 21, 2019.
Chun and Spalink, Planetlab, Slice Creation and Management dated Jul. 17, 2003.
en.wikipedia.org, Computer Performance from Sep. 19, 2012, https://en.wikipedia.org/w/index.php?title=Computer_performance&oldid=513612945, last viewed Oct. 23, 2019.
en.wikipedia.org, Computer Performance, https://en.wikipedia.org/wiki/Computer_performance, last viewed Oct. 23, 2019.
en.wikipedia.org, Computer power, https://en.wikipedia.org/w/index.php?title=Computing_power&oldid=537279636, last viewed Oct. 23, 2019.
en.wikipedia.org, Dhrystone, https://en.wikipedia.org/wiki/Dhrystone, last viewed Oct. 8, 2019.
Goiri et al., Economic Model of a Cloud Provider Operating in a Federated Cloud, Information Systems Frontiers—Sep. 2012, last viewed Oct. 21, 2019.
en.wikipedia.org, Haswell (microarchitecture), https://en.wikipedia.org/wiki/Haswell_(microarchitecture), last viewed Oct. 8, 2019.
Mudali et al., Cooperative Resource Provisioning for Futuristic Cloud Markets last viewed Oct. 7, 2019.
en.wikipedia.org, Multi-core processor, https://en.wikipedia.org/wiki/Multi-core_processor#Technical_factors, last viewed Oct. 8, 2019.
en.wikipedia.org, Nehalem (microacrchitecture), https://en.wikipedia.org/wiki/Nehalem_(microarchitecture)#Performance_and_power_improvements, last viewed Oct. 8, 2019.
VMTurbo, Inc., VMTurbo Operations Manager 5.1 Users Guide last viewed Oct. 21, 2019.
Sadasivam and Selvi, Comparative Performance Study of SPEC INT 2006 benchmarks on Nehalem, Sandybridge and Haswell Microarhitectures, last viewed Oct. 8, 2019.
en.wikipedia.org, Sandy Bridge, https://en.wikipedia.org/wiki/Sandy_Bridge, last viewed Oct. 8, 2019.
Nakamoto, Bitcoin: A Peer-to-Peer Electronic Cash System last viewed Sep. 18, 2019.
en.wikipedia.org, Shapley value, https://en.wikipedia.org/wiki/Shapley_value, last viewed Oct. 21, 2019.
Sutherland, Communications of the ACM, A Futures Market in Computer Time, vol. 11, No. 6, Jun. 1968, last viewed Oct. 7, 2019.
en.wikipedia.org, Thread (computing), https://en.wikipedia.org/wiki/Thread_(computing), last viewed Oct. 8, 2019.
Veena et al., 2016 IEEE $14^{th}$ Itl Conf on Dependable, Autonomic and Secure Computing, $14^{th}$ Intl Conf on Pervasive Intelligence and Computing, $2^{nd}$ Intl Conf on Big Data Intelligence and Computer and Cyber Science and Technology Congress; Temporal and Spatial Trend Analysis of Cloud Spot Instance Pricing in Amazon EC2, last viewed Oct. 7, 2019.
VMTurbo White Paper, Challenging Traditional Virtual & Cloud Paradigms, How Economic Abstractions Address the Scale and Complexity of Today's Virtualized Data Center, 2005, last viewed Oct. 8, 2019.
Wee; 2011 $11^{th}$ IEEE/ACM International Symposium on Cluster, Cloud and Grid Computing; Debunking Real-Time Pricing in Cloud Computing last viewed Oct. 7, 2019.
en.wikipedia.org, Whetstone (benchmark), https://en.wikipedia.org/wiki/Whetstone_(benchmark), last viewed Oct. 8, 2019.
Whetstone Benchmark History and Results, Roy Longbottom's PC Benchmark Collection, 2014, http://www.roylongbottom.org.uk/whetstone.htm, last viewed Oct. 8, 2019.
Wu et al.; IEEE Transactions on Cloud Computing, vol. 4, No. 3, Jul.-Sep. 2016; A Reference Model for Virtual Machine Launching Overhead last viewed Oct. 21, 2019.
Yao et al.; IEEEAccess, Optimal Overbooking Policy for Cloud Service Providers: Profit and Service Quality; vol. 7, 2019; last viewed Oct. 21, 2019.

(56) References Cited

OTHER PUBLICATIONS

Yemini et al.; MarketNet: Market-Based Protection of Information Systems, In Proceedings of ICE'98, First International Conference on Information and Computation Economies, Oct. 1998, Charleston, SC; last viewed Oct. 21, 2019.
Yemini et al.; MarketNet: Using Virtual Currency to Protech Information Systems last viewed Oct. 21, 2019.
Amazon EC2 Reserved Instances, Ihttps://aws.amazon.com/ec2/pricing/reserved-instances/, last reviewed Nov. 11, 2019.
Amazon EC2 Spot, Ihttps://aws.amazon.com/ec2/spot/, last viewed Nov. 11, 2019.
ASK plan, SONM, https://docs.sonm.com/concepts/main-entities/ask-plan, last viewed Nov. 6, 2019.
Deal, SONM, https://docs.sonm.com/concepts/main-entities/deal, last viewed Nov. 6, 2019.
Crosbie, Inverse.com, Here's How Much a Ticked on a SpaceX Flight to the Moon Will Cost, https://www.inverse.com/article/28424-spacex-moon-mission-ticket-cost-elon-musk, dated Feb. 27, 2017, last viewed Nov. 6, 2019.
How You Are Billed—Amazon Elastic Compute Cloud, https://docs.aws.amazon.com/AWSEC2/latest/UserGuide/concepts-reserved-instances-application.html, last viewed Nov. 11, 2019.
Neumann, Seigniorage in the United States: How Much Does the U.S. Governement Make from Money Production?, last viewed Nov. 7, 2019.
On-Deman Instances—Amazon Elastic Compute Cloud, https://docs.aws.amazon.com/AWSEC2/latest/UserGuide/ec2-on-demand-instances.html, last viewed Nov. 11, 2019.
Order, SONM, https://docs.sonm.com/concepts/main-entities/order, last viewed Nov. 6, 2019.
Stalcup; If you use AWS, RIs, you need to use the new queuing option; ParkMyCloud, dated Oct. 23, 2019, https://www.parkmycloud.com/blog/aws-ri/, last viewed Nov. 11, 2019.
Chapel, How Do I Stop Wasting Money on Reserved Instances?; ParkMyCloud, dated Oct. 31, 2019, https://www.parkmycloud.com/blog/how-to-stop-wasting-money-on-reserved-instances/, last viewed Nov. 11, 2019.
Resources, SONM, https://docs.sonm.com/concepts/main-entities/resources, last viewed Nov. 6, 2019.
Barr; AWS News Blog, New—Savings Plans for AWS Compute Services, dated Nov. 6, 2019, https://aws.amazon.com/blogs/aws/new-savings-plans-for-aws-compute-services/, last viewed Nov. 11, 2019.
Schedule Reserved Instances—Amazon Elastic Compute Cloud, https://docs.aws.amazon.com/AWSEC2/latest/UserGuide/ec2-scheduled-instances.html, last viewed Nov. 11, 2019.
en.wikipedia.org, Seigniorage, https://en.wikipedia.org/wiki/Seigniorage, last viewed Nov. 6, 2019.
en.wikipedia.org, Service-level agreement, https://en.wikipedia.org/wiki/Service-level_agreement#Cloud_computing, last viewed Nov. 6, 2019.
en.wikipedia.org, Service-level objection, https://en.wikipedia.org/wiki/Service-level_objective, last viewed Nov. 6, 2019.
SONM token, SONM, https://docs.sonm.com/concepts/main-entities/sonm-token, last viewed Nov. 6, 2019.
Prisco, Bitcoin Magazine, SONM: A Universal 'Fog Supercomputer' Powered by the Ethereum Blockchain, dated Sep. 5, 2017, https://bitcoinmagazine.com/articles/sonm-universal-fog-supercomputer-powered-ethereum-blockchain, last viewed Nov. 6, 2019.
Task, SONM, https://docs.sonm.com/concepts/main-entities/task, last viewed Nov. 6, 2019.
Tomas et al.; 2014 IEEE International Conference on Cloud and Autonomic Computing; The straw that broke the camel's back: safe cloud overbooking with application brownout; last viewed Nov. 6, 2019.
Ying, ICT Management, Sponge: An Oversubscription Strategy Supporting Performance Interference Management in Cloud, China Communications dated Nov. 2015, last viewed Nov. 6, 2019.
en.wikipedia.org, Service level indicator, https://en.wikipedia.org/wiki/Service_level_indicator, last viewed Nov. 13, 2019.
en.wikipedia.org, Quality of service, https://en.wikipedia.org/wiki/Quality_of_service, last viewed Nov. 13, 2019.
en.wikipedia.org, Virtual machine, https://en.wikipedia.org/wiki/Virtual_machine, last viewed Dec. 11, 2019.
Amazon Compute Service Level Agreement last updated Mar. 19, 2019, https://aws.amazon.com/compute/sla/, last viewed Dec. 9, 2019.
Compute Engine Service Leval Agreement (SLA) last modified Mar. 28, 2019, https://cloud.google.com/compute/sla, last viewed Dec. 9, 2019.
Java—Multithreading—Tutorialspoint, https://www.tutorialspoint.com/java/java_multithreading.htm, last viewed Jan. 31, 2020.
Zhang et al., Journal of the Atmospheric Sciences, vol. 76, What Is the Predictability Limit of Midlatitude Weather?, dated Apr. 2019, last viewed Jan. 30, 2020.
English translation "Computer resource trade system and computer resource trade program" application JP 2004-206273 published Jul. 22, 2004.
English translation "Network computing system and multiprocessor computer" application JP 2007-264886 published Oct. 11, 2007.
English translation "Resource allocation system, Information processor, resource allocation method, and resource allocation program" application JP 2007-323439 published Dec. 13, 2007.

* cited by examiner

SYSTEM AND METHOD FOR CONTROLLING ACCESS TO RESOURCES IN A MULTICOMPUTER NETWORK

COPYRIGHT AND TRADEMARK NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

FIELD OF THE INVENTION

Embodiments of the present invention relate to systems and methods for controlling access to resources in a multicomputer network.

BACKGROUND OF THE INVENTION

Figure 1:
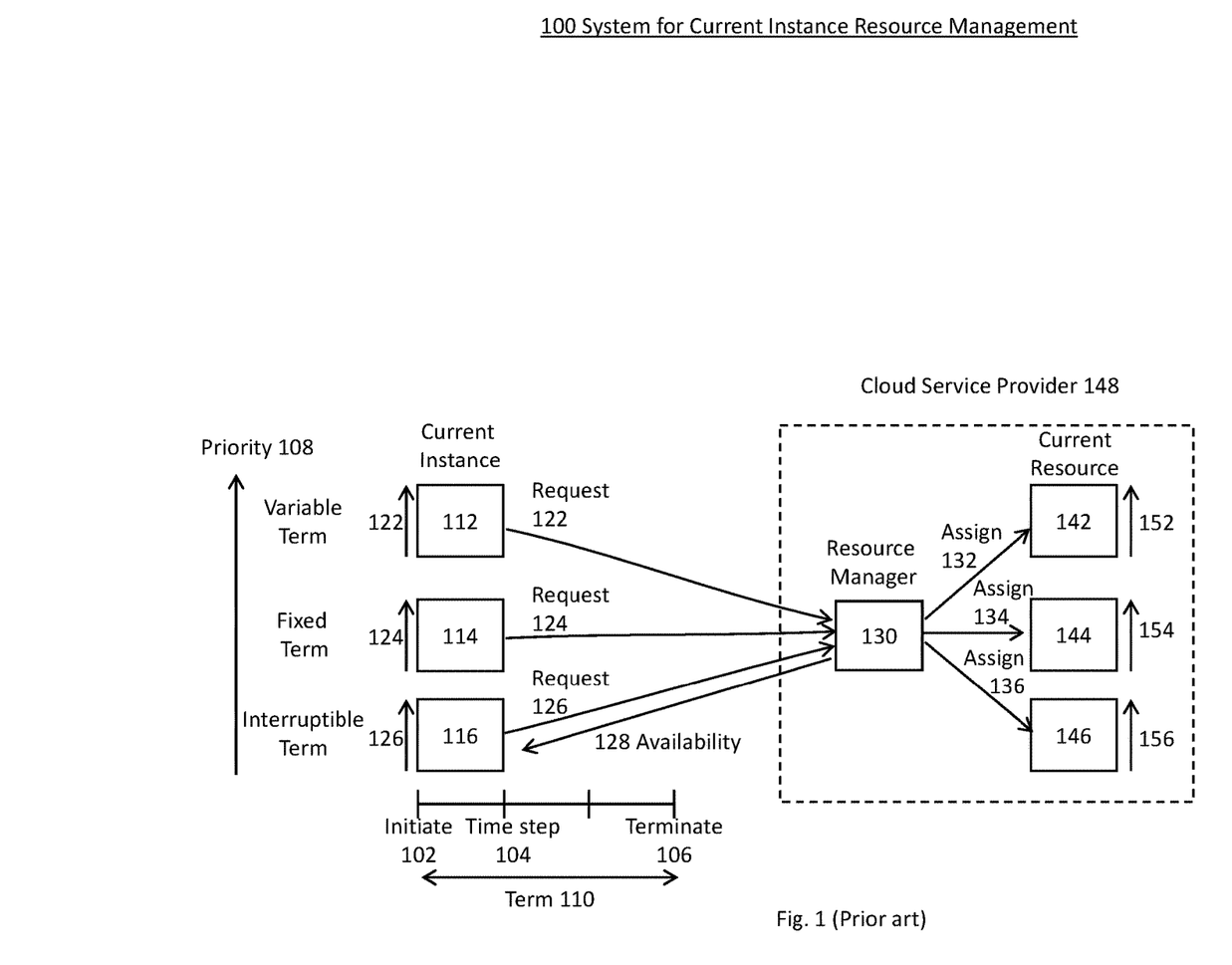
FIG. 1 is a schematic of a prior art system for current instance resource management.

FIG. 1 is a schematic of a prior art system 100 for current instance resource management. The system comprises:
- one or more computer implemented current instances 112, 114, 116;
- a computer implemented resource manager 130; and
- one or more computer implemented current resources 142, 144, 146.

The system may be owned or controlled by a cloud computing service provider 148, such as Amazon EC2, Google Cloud or Microsoft Azure.

Current Instances

An instance is "current" in the sense that it is established at about the time it is initiated. When an instance is established, a user receives a price from the cloud service provider and, if the user accepts the price, payment or commitment for payment is provided to the cloud service provider. The user then initiates the current instance in the sense that a request for use of current resources is made. Using a resource may comprise the steps of transferring program data and/or execution instructions to said resource for execution during a time step. Initiation may be immediate or within a relatively short time period (e.g. 3 months) after establishment. The period between establishment and initiation is considered short if there has been no substantial change in the current resources available. A substantial change might be a significant capacity expansion (e.g. more than 5%) or a significant upgrade to the performance of the current resources (e.g. upgrade to faster CPUs).

Each current instance may be described by a specification 122, 124, 126. The specification may comprise a description of one or more desired resources, performance metrics, a service level agreement (SLA) and/or guaranteed service level objectives (SLO). An exemplary desired resource might include one or more of a type of CPU or vCPU, a number of cores of said CPU or vCPU, a memory allocation, and an operating system. A desired resource may be a physical resource or a virtual resource. As used herein, a virtual resource is the combination of a physical resource of a first type and emulation software that makes the physical resource function as if it were a physical resource of a second type.

The performance metrics may be any quantitative indication of performance. Suitable performance metrics for a CPU or vCPU include clock speed, MFLOP rating, one or more of the SPEC INT 2006 benchmarks, and/or a percent uptime.

Each instance might be described by a term 110. The term might be an integral number of time steps 104. The term may begin at an initial time 102 and end at a terminal time 106. The time steps may be any unit of time appropriate to the system, such as a second, a minute or any larger or smaller time unit. A minimum term, such as a minute, may be specified. The minimum term may be an integral number of time steps, such as 60 seconds.

The type of term of an instance may be a variable term 112, a fixed term 114, or an interruptible term 116. Other types of terms may be provided, such as combinations of variable, fixed, and interruptible terms.

A variable term instance 112 initiates and terminates at the discretion of a user. Variable term instances tend to have a high priority 108 relative to other types of instances. A high priority means that the variable instances will be assigned to current resources before other instances, such as fixed term instances or interruptible term instances. Variable term instances also may have a correspondingly higher cost per unit time of their term.

A fixed term instance 114 has an initiation time at the discretion of a user, but the term is for a fixed, predefined period. A predefined term may be one year, three years or any other amount of time. Users are billed at a fixed rate for a fixed term instance irrespective of whether or not the instance is actually using current resources. The price per unit time of their term, however, is generally lower than for a variable term instance. The fact that fixed term instances often do not use current resources continuously over their term means that from time to time, current resources may become available for use by other instances, such as interruptible term instances.

An interruptible term instance 116 has an initiation time at the discretion of a user but may have a termination time at the discretion of the resource manager 130. The resource manager may provide a relative availability 128 of current resources to an interruptible instance. The relative availability may be expressed as a spot price for use of a current resource over a given time step 104. The interruptible term instance may receive the spot price and, if it is below a threshold price that the interruptible instance is willing to pay, it will initiate. If the spot price is above a threshold price that the interruptible instance is willing to pay, the interruptible term instance may either not initiate, or if it has previously initiated, it may terminate its own term. Thus, the resource manager can effectively control the duration of the terms of interruptible term instances through variations in the spot price. This, in turn, allows the resource manager to control the availability of current resources for higher priority instances.

Current Resources

Each current resource 142, 144, 146 may be described by a specification 152, 154, 156 which defines its capabilities. A specification might list one or more of, a performance metric, a type of CPU, a number of cores of said CPU, a memory allocation, and an operating system. A current resource may be a physical resource (e.g. CPU) or a virtual resource (e.g. vCPU). The performance metrics may be any quantitative indication of performance, such as a CPU clock speed, MFLOP rating, one or more of the SPEC INT 2006 benchmarks, a percent uptime, or a memory storage capacity.

Assignment of Current Resources by the Resource Manager

The resource manager 130 may receive one or more requests 122, 124, 126 from one or more current instances 112, 114, 116 at the beginning of a given time step 104. The resource manager then assigns 132, 134, 136 the instances to the current resources with matching specifications. An assignment may include the step of booting up a virtual resource on a given physical resource such that the virtual resource matches the specification of an instance.

Before assignment, the resource manager may forecast to what extent the current resources are adequate for the current instance requests. If the resources are not adequate, then the resource manager may reduce the availability 128 (e.g. raise the spot price) of current resources to the interruptible term instances. Some fraction of the interruptible instances may shut off so that adequate resources will be available to the variable term and fixed term instances. Alternatively, if there is an oversupply of current resources, the resource manager may increase the availability (e.g. lower spot price) of current resources to the interruptible term instances so that more of the interruptible instances will turn on and increase the utilization of the current resources.

If, at any given time step, the resource manager cannot meet the requests of all of the variable term and fixed term instances, then unscheduled downtime may result and their respective service level agreements (SLAs) may be violated. The cloud service provider 148 may then be liable for SLA violation penalties. SLA violation penalties may be in the form of a monetary credit provided to the users of the current instances that are denied current resources. Compliance with the SLAs may be monitored by the current instances or the resource manager with provision of output to their respective users in a graphical user interface.

Underutilization of Current Resources

It has been reported that even with a resource manager configured as described above, the total utilization of current resources in a cloud service provider may be only be about 40%. Thus, there is a need for an improved resource manager that achieves higher total utilization without incurring increased SLA violation penalties. Furthermore, while improving the percentage of used resources is mostly desirable, a cloud service provider may also be concerned with being able to handle peak demand. This may be more important than increasing the average percentage of resources in use. There is further need, therefore, for an improved resource manager that will provide users a trustworthy ability to defer demand of an instance for current resources from a peak load period to a future period of the user's choice. Cloud service providers may then be able to sell these deferrable instances as if they were running at near 100% usage without the deferrable instances actually being redeemed.

SUMMARY OF THE INVENTION

The summary of the invention is provided as a guide to understanding the invention. It does not necessarily describe the most generic embodiment of the invention or the broadest range of alternative embodiments.

Figure 2:
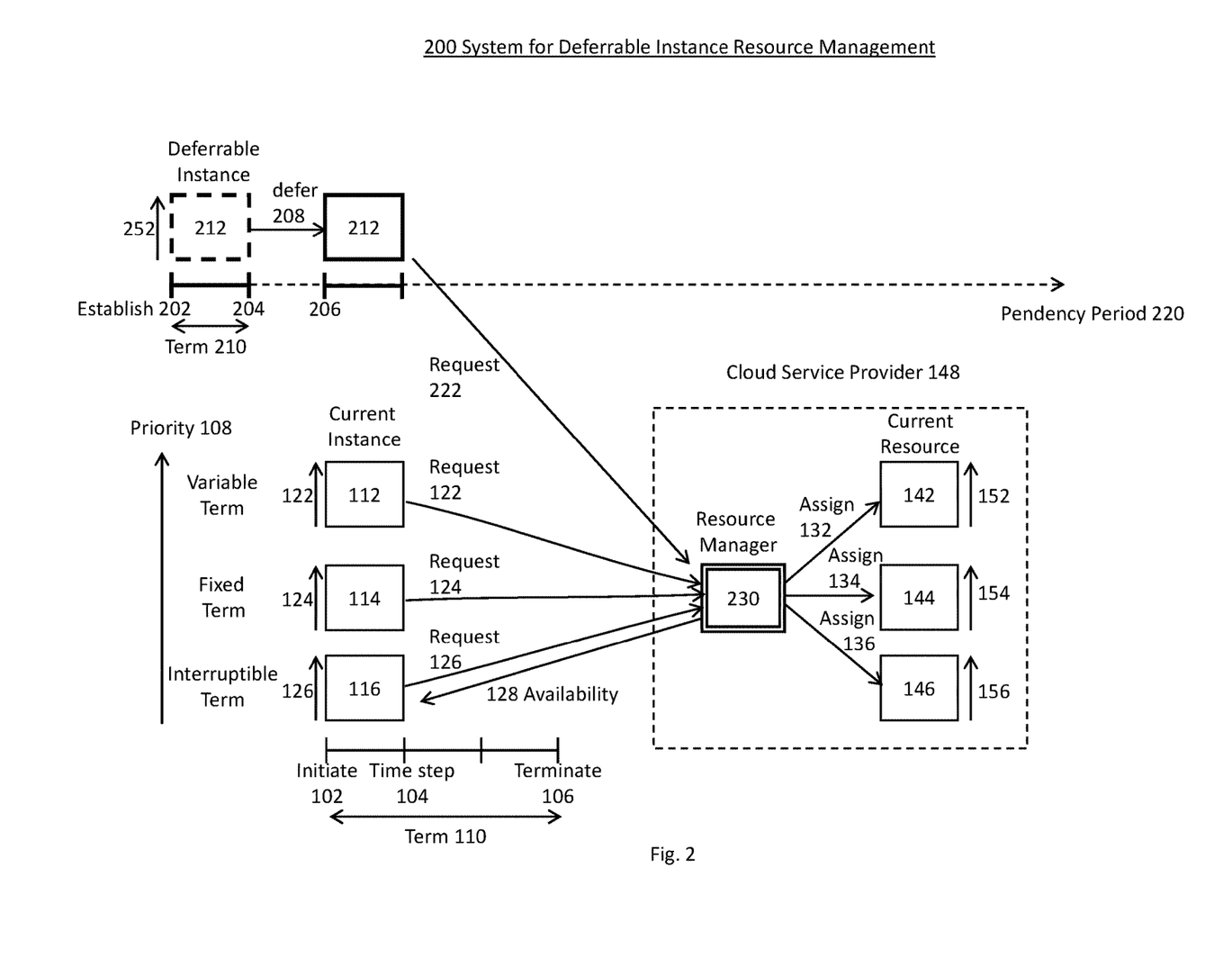
FIG. 2 is a schematic of a system for deferrable instance resource management.

FIG. 2 is a schematic of a system 200 for deferrable instance resource management. The system comprises one or more of the current instances 112, 114, 116 and current resources 142, 144, 146 previously described with respect to the prior art system 100. Assignment of instances to resources is controlled by a computer implemented deferrable instance resource manager 230. In addition to the functionality of the prior art resource manager 130, the deferrable instance resource manager is configured to manage the resource requests 222 of one or more deferrable instances 212.

Deferrable Instances

A deferrable instance is established by a first user at a previous time 202 to the current time 102. Initiation (e.g. request for resources 222) can be deferred 208 to a later time 206 at the discretion of the first user. The steps for establishing a deferrable instance may include the receipt of a price from the cloud service provider and the transmission of a payment or payment commitment to the cloud service provider. Payment may be in the form of fiat currency (e.g. dollars), other currency (e.g. crypto currency) or any other consideration (e.g. stock or a different type of deferrable instance). Payment or payment commitment may be provided by any mutually agreeable terms, such as financing over a period of time.

Each deferrable instance 212 may be defined by a specification 252. The specification may comprise one or more desired physical or virtual resources, performance metrics, a service level agreement (SLA), guaranteed service level objectives (SLO), and/or term. An exemplary desired resource might include one or more of a type of CPU or vCPU, a number of cores of said CPU or vCPU, a memory allocation, and/or an operating system.

The performance metrics may be any quantitative indication of performance. Suitable performance metrics for a CPU, vCPU, or individual core thereof, include clock speed, MFLOP rating, one or more of the SPEC INT 2006 benchmarks, and/or a percent uptime. A performance metric may also include a memory storage capacity.

The service level agreements and service level objectives may be similar to the other instances mentioned above. The SLA may indicate that the deferrable instance has a priority. The priority may be at any level from above that of a variable term instance to below that of an interruptible term instance. As used herein, a priority level "above that of a variable term instance" may include an absolute right to initiate a deferrable instance at will, at any time and without prior notice. As used herein, initiating "at any time" includes initiating immediately after establishment. It may also include initiating and at an infinite time in the future. As will be described in more detail below, the priority may be set to increase utilization of resources without incurring undue SLA violation penalties.

The term 210 of the deferrable instance may be fixed or variable. The term may be an integral number of time steps 204. The time steps 204 of a deferrable instance may be an integral number of the time steps 104 of the resource manager or vice versa. The deferrable instance may be configured so that multiple fixed term deferrable instances with similar or the same specification may be initiated sequentially to emulate a variable term instance.

A pendency period 220 may be specified for the deferrable instance. The pendency period is the period of time that the deferrable instance may be initiated. The pendency period may be finite (e.g. 10 years) or unlimited. As will be described in more detail below, the pendency period may be long in the sense that there may be significant expansion of capacity of current resources and/or a significant upgrade in the performance of current resources such that the deferrable instance can access the future expansion or upgrade.

Assignment of Current Resources to Deferrable Instances

The method of assignment of current resources to the combination of one or more deferrable instances and current instances is illustrated in FIG. 2. The resource manager 230 may receive one or more requests 122, 124, 126, 222 from one or more current instances 112, 114, 116 and/or deferrable instances 212 that have been initiated 206 at or before the current time 102. The requests are at the beginning of a given time step 104. The resource manager then assigns 132, 134, 136 the instances to the current resources with specifications that match the specifications of the instances.

Before assignment, the resource manager may forecast to what extent the current resources are adequate for the current and deferrable instance requests. As described above, if the resources are not adequate, then the resource manager may reduce the availability 128 of current resources to the interruptible term instances to avoid SLA violation penalties. Further resource control can be obtained by setting the priority of deferrable instances to a low value such that if necessary, the terms of the deferrable instances can be interrupted to free up resources. To make up for the low priority, the price of deferrable instances can be set low enough so that users will purchase them in anticipation of a future increase in supply or performance of current resources. Thus, overall utilization of the current resources can be increased. Alternatively, the holders of deferrable instances could be paid to defer their exercise or the right to use an instance. Payment could be in any form including what would essentially be an interest payment by giving additional deferrable instances, term, or any other form of compensation to the user. In an alternative embodiment, the price for deferral would be strictly market determined. In an extreme situation, the resource manager could just buy back outstanding deferrable instances (at a market price) and/or buy current instances from another provider.

DETAILED DESCRIPTION

The detailed description describes non-limiting exemplary embodiments. Any individual features may be combined with other features as required by different applications for at least the benefits described herein. As used herein, the term "about" means plus or minus 10% of a given value unless specifically indicated otherwise. As used herein, the term "substantially the same" means that two items are at least 90% the same.

As used herein, a "computer-based system", "computer-based resource", "computer implemented system", "computer implemented resource", or the like comprises an input device for receiving data, an output device for outputting data in tangible form (e.g. printing or displaying on a computer screen), a permanent memory for storing data as well as computer code, and a microprocessor for executing computer code wherein said computer code resident in said permanent memory will physically cause said microprocessor to read-in data via said input device, process said data within said microprocessor and output said processed data via said output device.

As used herein, the phrase "configured to" or the like means that a computer-based system is programmed or otherwise physically modified (e.g. provision of an input and/or output device) to carry out a particular action.

As used herein, the term "shaped" means that an item has the overall appearance of a given shape even if there are minor variations from the pure form of said given shape.

As used herein, the term "generally" when referring to a shape means that an ordinary observer will perceive that an object has said shape even if there are minor variations from said shape.

As used herein, to "use" a computer-based resource may include the step of transferring program data and/or execution instructions to said computer-based resource for execution during a time step. It may also include the steps of executing a program or any other use that the computer-based resource is suitable for.

As used herein, relative orientation terms, such as "up", "down", "top", "bottom", "left", "right", "vertical", "horizontal", "distal" and "proximal" are defined with respect to an initial presentation of an object and will continue to refer to the same portion of an object even if the object is subsequently presented with an alternative orientation, unless otherwise noted.

As used herein, disclosure of a singular element is also a disclosure of a plural element and vice versa unless otherwise noted.

Additional Deferrable Instances

Figure 3:
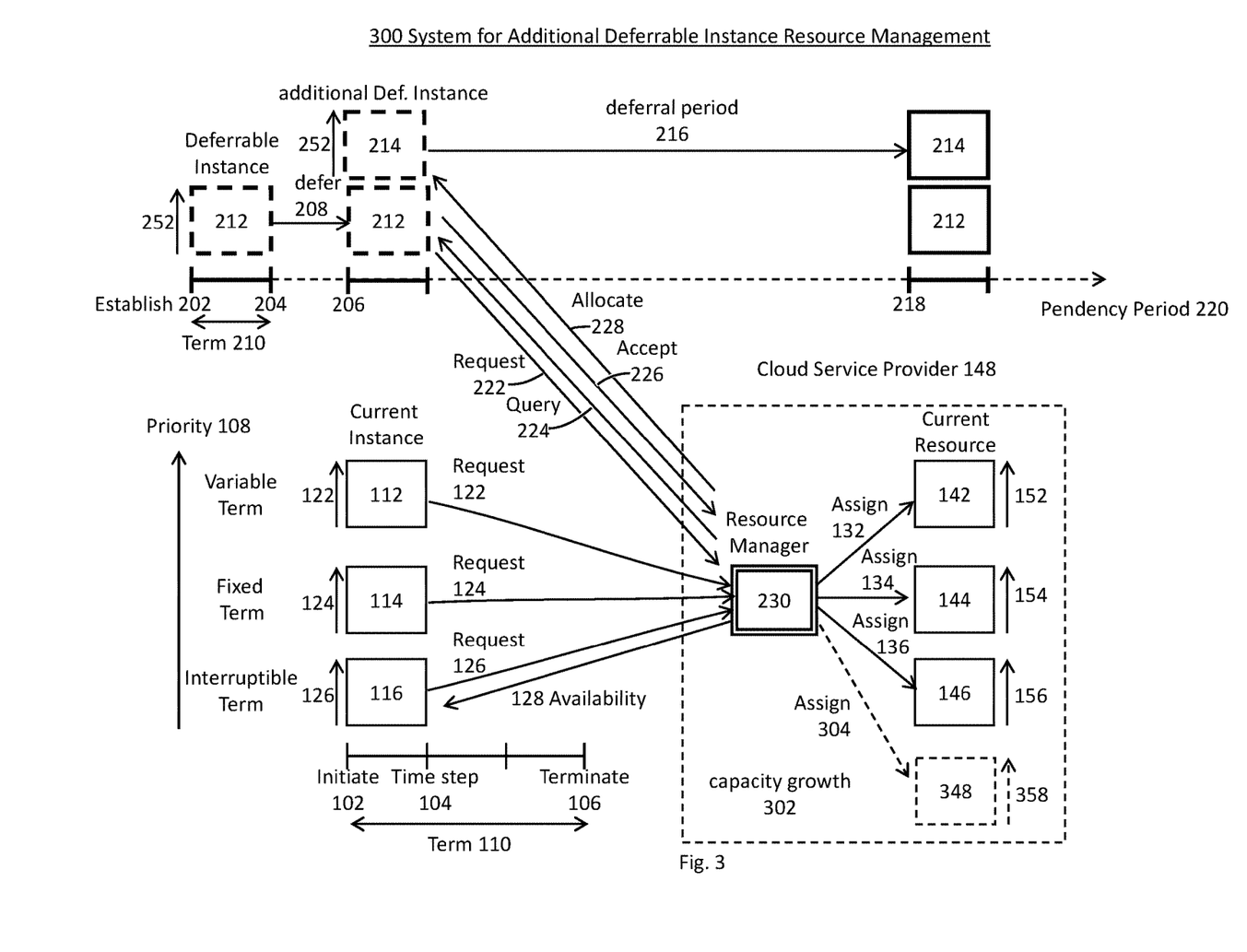
FIG. 3 is a schematic of a system for additional deferrable instance resource management.

FIG. 3 is a schematic of a system 300 for additional deferrable instance resource management. In order to increase resource utilization without incurring undue SLA violation penalties, the resource manager 230 may be configured to offer one, or more, or a fraction, of an additional deferrable instance 214 to a first user in exchange for said first user withdrawing or not initiating a request for resources 222 from a deferrable instance 212 at a current time 102. The resource manager may do this in anticipation of high utilization of current resources that may lead to SLA violation penalties.

The offer may be in the form of a query 224 transmitted from the resource manager to the deferrable instance. The query may comprise a deferral period 216 during which the deferrable instance and/or additional deferrable instances will not be allowed to initiate without penalty or not allowed to initiate at all. The computer implemented deferrable instance may be configured to compare the terms of the query (e.g. quantity of additional deferrable instances and a deferral period) with one or more deferral thresholds, to automatically accept 226 or reject the query. If the query is accepted 226, then the resource manager may allocate 228 the additional deferrable instance to the first user and may keep a record of the deferral period associated with the deferrable instance and additional deferrable instance.

All of the instances 112, 114, 116, 212 that are authorized to make requests for resources may be identified by an identification number or identification code. The instances may also have an associated authorization code. When an instance makes a request for resources, the request may comprise the identification number and authorization code. Any means of secure authorization may be used.

If a deferrable instance, additional or otherwise, makes a request for resources, then the resource manager may check its records to confirm that the request is not made during a deferral period previously assigned to the deferrable instance making the request based on said deferrable instance's identification number. If it is during the deferral period, then the resource manager may either decline the request for resources or may assess a previously specified penalty to the first user. The penalty can be any kind of penalty, such as a monetary penalty or a revocation of a quantity of previously issued deferrable instances to the first user.

The deferral period 216 may be "long" in the sense that there may be a significant addition 302 of new resources 348 during the deferral period. The new resources may have a given specification 358. When the new resources are online 218, the resource manager 230 can assign them 304 to requests. Deferral periods of 3 months or more may be considered long. Thus, a first user can participate in the anticipated capacity growth of a cloud service provider by accepting additional deferrable instances in exchange for a deferral period that is long. Nonetheless, any deferral period may be suitable.

The additional deferrable instances may be awarded periodically to the first user over the deferral period so that the computing time available to the first user grows over time. The quantity of deferrable instances that are awarded at any given time may be proportional to the total quantity of deferred instances, additional or otherwise, the first user has. Thus, the growth may compound over time.

The cloud service provider for its part, may adjust the quantity of additional deferrable instances specified in a query and their associated deferral periods to, in effect, finance future capacity expansion.

In an alternative embodiment, deferrable instances are transferable to other users. A market may be created with deferrable instance pricing that varies in response to market forces, such as resource availability versus demand for resources. Thus, deferrable instances may serve as a means for storing and transferring wealth, particularly in a financial crisis, such as a loss of faith in a fiat currency.

Method for Managing Assignment of Resources and Additional Deferrable Instances

Figure 5:
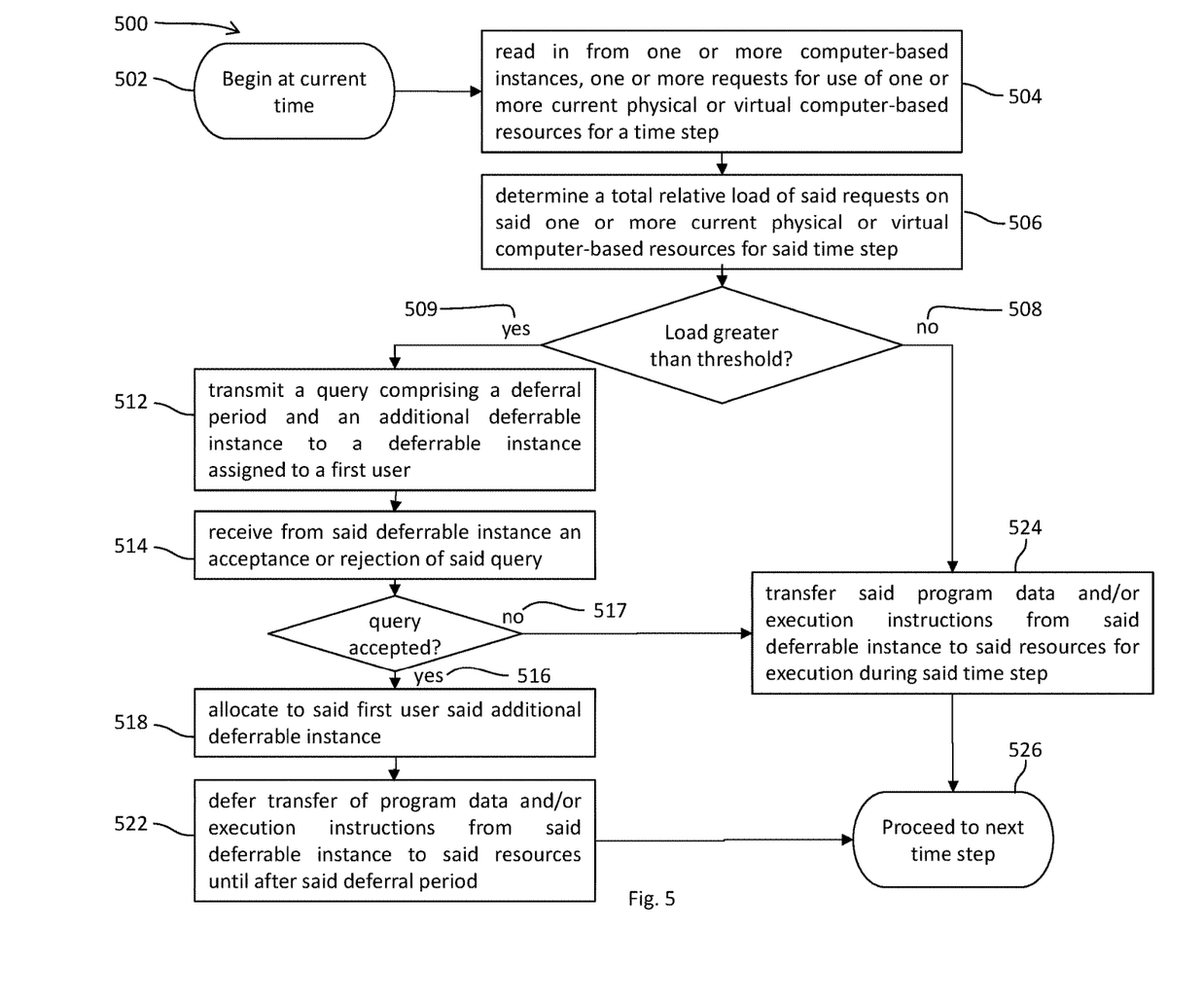
FIG. 5 is a flow chart of a method for managing additional deferrable instances.

FIG. 5 is a flow chart of an exemplary method 500 for managing assignment of resources and additional deferrable instances. Referring to FIGS. 3 and 5, the computer-based network resource manager 230 is configured to carry out the steps:
- a) read in 504, at a current time 502, from one or more computer-based instances 212, 112, 114, 116, one or more requests 222, 122, 124, 126 for use of, and optionally including to transfer program data and/or execution instructions to one or more current physical or virtual computer-based resources 142, 144, 146 for execution during a time step 104 wherein:
  - i) said time step has a duration of a unit time period;
  - ii) at least one of said computer-based instances is a deferrable instance 212;
  - iii) said deferrable instance is assigned to a first user;
  - iv) said deferrable instance comprises:
    1) a technical specification and performance metric 252 that substantially matches a technical specification and performance metric of an original physical or virtual computer-based resource that was selected by said first user when said deferrable instance was established 202; and
    2) a term 210 equal to said unit time period; and
  - v) said deferrable instance 212 is configured to:
    1) receive 224 from said resource manager a query comprising:
      a) a deferral period 216 relative to said current time; and
      b) an assignment of an additional deferrable instance 214 to said first user wherein said additional deferrable instance:
        i) has substantially the same 252 technical specification, performance metric and term as said deferrable instance; and
        ii) may only be initiated after said deferral period;
    2) accept 226 or reject said query based on said deferral period relative to a deferral threshold; and
    3) upon acceptance of said query, defer said request by said deferrable instance for said use of said one or more current physical or virtual computer-based resources (e.g. defer said request by said deferrable instance to transfer said program data and/or execution instructions to said one or more current physical or virtual computer-based resources) until after said deferral period;
- b) determine 506 a total relative load of said requests on said one or more current physical or virtual computer-based resources 142, 144, 146 for said time step;
- c) when said total relative load is greater 509 than a load threshold, execute the steps:
  - i) transmit 512 said query to said deferrable instance;
  - ii) receive 514 from said deferrable instance an acceptance or rejection of said query;
  - iii) upon receipt of an acceptance 516 of said query, execute the steps:
    1) allocate 518 to said first user said additional deferrable instance; and
    2) assign 522, during said time step, said one or more current physical or virtual computer-based resources to said computed-based instances in accordance with said requests, but defer said transfer of said program data and/or execution instructions from said deferrable instance to said one or more current physical or virtual computer-based resources until after said deferral period; or
  - iv) upon receipt of a rejection 517 of said query, execute the step:
    1) transfer 524 said program data and/or execution instructions from said deferrable instance to said one or more current physical or virtual computer-based resources for execution during said time step; and
- d) when said total relative load is less than or equal 508 to said load threshold, execute the step:
  - i) transfer 524 said program data and/or execution instructions from said deferrable instance to said one or more current physical or virtual computer-based resources for execution during said time step.

At the end 526 of the time step, the resource manager 230 may begin 502 the method 500 again for the next time step.

If a deferrable instance has initiated a program on a computer-based resource during a previous time step, then the rejection of a query offering an additional deferrable instance in exchange for a deferral period may mean that the "execution instructions" that are transferred to said computer-based resource may simply comprise the absence of an interrupt instructions for the currently executing program. Conversely, if the query is accepted, then the "deferral of transfer of executions instructions" may comprise the actual transfer of said interrupt instructions to said computer-based resource that had been executing the previously initiated program.

Alternative Methods

The additional deferrable instance does not necessarily have to have substantially the same technical specification and performance metric as the deferrable instance. For example, if the cloud service provider has upgraded the resources since when the deferrable instance was established, then the additional deferrable instance may have a technical specification and performance metric that is as good or better than the technical specification and performance metric that had been originally assigned to the deferrable instance when it was established. The upgrading of resources will be discussed in more detail below with respect to FIG. 4.

The term of an additional deferrable instance offered in a query does not necessarily have to be the same as the term of the deferrable instance which receives the query.

The deferral period of an additional deferrable instance offered in a query does not necessarily have to be the same as the deferral period of the deferrable instance which receives the query. For example, the query may specify a deferrable period for the deferrable instance of a few hours to accommodate a short-term spike in demand. The deferral period of the additional deferrable instance offered in the query may be months or even years to allow for the cloud service provider to increase capacity to accommodate the potentially large number of additional deferrable instances that might be offered during a period of heavy use of current resources.

The additional deferrable instance can be assigned to a third party other than the first user.

There may be restrictions on the transfer of deferrable instances to other users.

Deferrable Instance GUI

The computer-implemented deferrable instance may comprise a screen with a graphical user interface. The computer-implemented deferrable instance may be configured to present a query from the resource manager to a first user on said graphical user interface such that said first user can decide to accept or reject the query.

The computer-implemented deferrable instance may additionally comprise an input device, such as a mouse, touch screen, keyboard or microphone, to receive a decision from the first user to accept or reject the query.

The computer-implemented deferrable instance may be configured to accept from a first user via the input device, a value of a deferral threshold for accepting or rejecting a query comprising an additional deferrable instance. The computer-implemented deferrable instance may be configured to present external data, such as market data, to a first user in order for the first user to set a deferral threshold for acceptance or rejection of a query comprising an additional deferrable instance. For example, if the first user is requesting computer-based resources to perform cryptocurrency mining, the deferrable instance may present on the GUI, the current market price for a given unit of cryptocurrency. Alternatively, or additionally, the deferrable instance may be configured to automatically adjust a threshold for acceptance of a query based on the current values of external data, such as market data.

Offer of Additional Deferrable Instances to Current Instances

The resource manager may be configured to offer additional deferrable instances to current instances and not just deferrable instances. For example, a first user may not need to use a fixed term instance continuously over its term. If a fixed term instance makes a request for resources during its term, the resource manager may make an offer of an additional deferrable instance in exchange for the first user postponing its request for resources to a later time during its term. Similarly, instead of raising a spot price to an interruptible term instance, a resource manager may offer an additional deferrable instance in exchange for the interruptible term instance withdrawing its request for resources.

Resource Substitution

Figure 4:
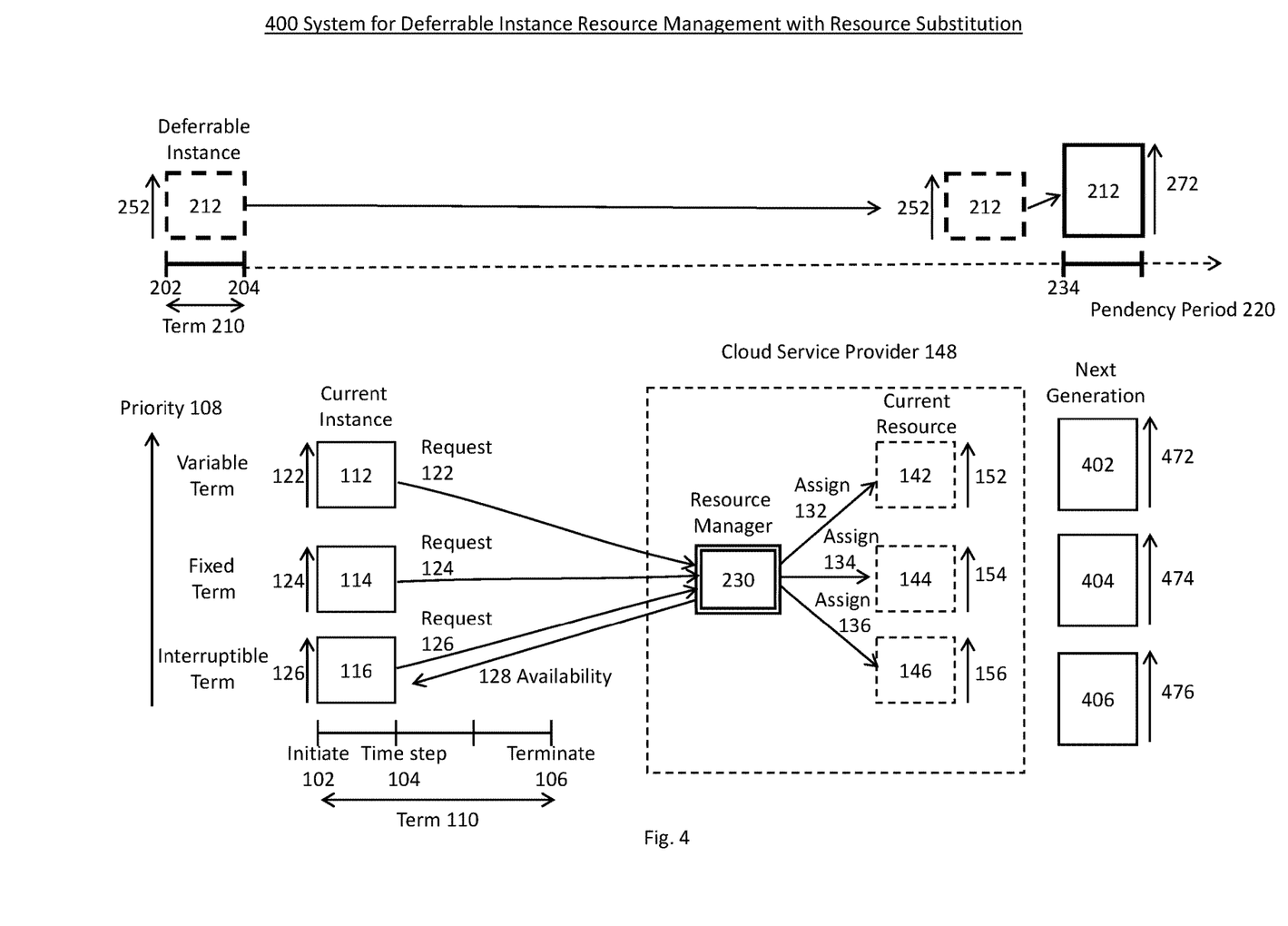
FIG. 4 is a schematic of a system for deferrable instance resource management with resource substitution.

FIG. 4 is a schematic of a system 400 for deferrable instance resource management with resource substitution. A first user may delay the initiation of a deferrable instance for a very long time 234 after its establishment 202. As used herein, a "very long time" may be the time it takes for the current resources 142, 144, 146 that were available when the deferrable instance was originally established, to be substantially replaced by next generation resources 402, 404, 406 with correspondingly improved technical specifications and performance metrics 472, 474, 476. Upon a receipt of a request for resources at the very later time 234, the resource manager 230 may carry out the steps:
 i) determine if any one of the technical specifications and performance metrics 472, 474, 476 of the now current next generation physical or virtual computer-based resources 402, 404, 406 substantially matches the technical specification and performance metric 252 of the deferrable instance; and
 ii) when none of the technical specifications and performance metrics of the now current physical or virtual computer-based resources substantially matches said technical specification and performance metric of said deferrable instance, carry out the steps:
  1) identify a group of one or more of said computer-based resources that has an aggregate technical specification and performance metric that meets or exceeds said technical specification and performance metric of said deferrable instance; and
  2) transfer program data and/or execution instructions from said deferrable instance to said group of one or more of said computer-based resources for execution during said time step.

The technical effect of this method of resource substitution is that the deferrable instance will, in effect, be automatically upgraded to the new technical specifications and performance metrics 272 that have become available since the upgrade to the next generation resources and retirement of the now obsolete resources that where specified when the deferrable instance was originally established.

The same method can be used by the resource manager before next generation resources are installed. For example, the resource manager may be able to assign current instances to resources owned or controlled by a third party, such as in a grid federation or cloud allocation. The resource manager can then select a group of third-party resources that meet or exceed the requirements of the deferrable instance.

The performance metrics may be one or more of a minimum CPU clock speed, a minimum MFLOP rating, any of the SPEC INT 2006 benchmarks, a percent uptime, a memory storage capacity, or any other metric suitable for the intended use of the deferrable instance. The performance metric may apply to a multi-core CPU or group of CPUs for multi-threaded programs or to an individual CPU or a core of a multi-core CPU for single threaded programs.

Multi-Threaded Programs

The program data that a deferrable instance may transfer to a physical or virtual computer-based resource may comprise a multi-threaded program. When identifying a group of one or more of computer-based resources that has an aggregate technical specification and performance metric that meets or exceeds the technical specification and performance metric of said deferrable instance, the resource manager 230 may be further configured to carry out the steps:
 a) determine if said program data and/or execution instructions comprise a multi-threaded program;
 b) when said program data and/or execution instructions comprise a multi-threaded program:
  i) limit said group of one or more computer-based resources to a group comprising a plurality of cores;
  ii) determine said aggregate technical specification and performance metric of said group based at least in part on an aggregate performance of said plurality of cores; or
 c) when said program data and/or execution instructions do not comprise a multi-threaded program:
  i) determine a core or CPU within said group that has the highest appropriate technical specification and performance metric comprising one or more of:
   1) a clock speed of said core or CPU;
   2) an MFLOP rating of said core or CPU; or
   3) a SPEC INT 2006 benchmark for said core or CPU; and
  ii) determine said aggregate technical specification and performance metric of said group based at least in part on said core or CPU with said highest appropriate technical specification and performance metric.

The program data and/or execution instructions that are transferred to a computer-based resource can be determined when a request to transfer is made. Thus, the group of resources that are determined may depend upon whether or not a multi-threaded program is specified in the program data at the time of the request. As advances are made in the multi-threading of different applications, the cost to a cloud service provider of providing resources to deferrable instances may decrease. The resource manager can take this into account when determining how many additional deferrable instances to offer in exchange for a certain deferral period. This, in turn, can lead to a growth in value of deferrable instances to the owner for applications that cannot be threaded.

Applications

Deferrable instances can be used for program data and/or execution instructions for any application. Suitable applications include, but are not limited to the following examples.

Example 1: Weather Forecasting

Weather forecasting is an example of an application where there is a competitive need for ever increasing computational resources. Whoever has the most accurate long-term weather forecaster will have a disproportionally larger share of the market. Any incremental increase in the accuracy of a forecast will yield substantial value to the forecaster that has the best system. Ten days is currently considered to be a practical upper limit of a weather forecast. Pushing that limit out even a small amount, such as a day, can have important economic consequences, such as in the field of storm tracking (e.g. hurricane). Thus, a user may wish to invest in a portfolio of deferrable instances whose relative computational power will grow with performance improvements in available computational resources. The program data and/or execution instructions of a deferrable instance applied to weather forecasting, therefore, may comprise:
 i) a set of initial conditions for a control volume;
 ii) a set of boundary conditions for said control volume;
 iii) a forecast time period for said control volume; and
 iv) computational fluid dynamic computer code to cause a group of one or more of said computer-based resources to determine a flow field in said control volume over a course of a time period based on said initial conditions and said boundary conditions.

The deferrable instance may be configured to set a deferral threshold based at least in part on:
 i) a required minimum accuracy at an end of said forecast time period; and
 ii) the technical specification and performance metric for a group of computer-based resources capable of meeting the required minimum accuracy.

If the technical specification and performance metric for the group is relatively low, then the deferrable instance may set a low deferral threshold since there is little competitive advantage to executing the weather forecasting program at the current time. If the technical specification and performance metric of the group is relatively high, then the deferrable instance may set a high deferral threshold since the deferrable instance would be sacrificing a current competitive advantage in exchange for the additional deferrable instances that would be assigned to the user.

The above deferrable instance can be applied to any application of computational fluid dynamics. This includes flow over an airfoil, flow within an enclosure, supersonic flow, transonic flow, and three-dimensional turbulent flow. These are all fields where there is a competitive advantage to having the very best capabilities.

The above deferrable instance may additionally be suitable for any modeling/simulation of highly non-linear complex dynamics, e.g. drug discovery/biological processes. This could be beyond just research but also for medical emergencies where there is a need to predict in real time a patient's response to a particular treatment/drug. An emergency room would need to have the capacity but might not be able to schedule these types of uses. To prepare, an AI might be on standby in a hospital as emergencies arise.

Example 2: Machine Learning

Machine learning (e.g. AI) is another example where there is a competitive need for ever increasing computational resources. A particularly important application of machine learning is object detection using a neural net. The program data and/or execution instructions for a deferrable instance training a neural net for object detection may comprise:
  i) a set of ground truth data for object detection;
  ii) a neural net comprising a plurality of node weight parameters; and
  iii) neural net training computer code to cause said group of one or more of said computer-based resources to determine optimal values of said node weight parameters.

The deferrable instance may be configured to set the deferral threshold based at least in part on:
  i) a required minimum accuracy of said convolutional neural net; and
  ii) a technical specification and performance metric of said group capable of meeting said required minimum accuracy.

Similar to example 1, if the technical specification and performance metric of the group is relatively low, then a low deferral threshold may be set. Conversely, if the technical specification and performance metric of the group is relatively high, then a high deferral threshold may be set.

Example 3: Proof-of-Work

Proof-of-work for block content of a block chain is another example where there is a competitive need for ever increasing computational resources. The program data and/or execution instructions for a deferrable instance with program data directed to proof-of-work may comprise:
  i) a block content of a blockchain;
  ii) a current degree of difficulty and desired validation period associated with said blockchain; and
  iii) proof-of-work computer code to cause said group of one or more of said computer-based resources to determine a nonce based on a hash of said nonce and said block content such that said hash is less than or equal to said degree of difficulty.

The deferrable instance may be configured to set the deferral threshold based at least in part on:
  i) a required minimum execution time per hash to find said nonce in said desired validation period; and
  ii) a technical specification and performance metric of said group that is capable of finding said nonce in said desired validation period.

Groups of Secondary Groups

When program data comprises a multi-threaded program, such as the above described proof-of-work computer code, the resource manager may build a group comprising a plurality of secondary resource managers. Each of the secondary resource managers may be configured to identify a secondary group of computer-based resources capable of executing at least one of the threads of the multi-threaded program. Each of said secondary groups of computer-based resources may be described by a secondary technical specification and performance metric. The technical specification and performance metric of the group as a whole may be based at least in part on an aggregate of the secondary technical specifications and performance metrics of the secondary groups.

Ownership and Transfer of Deferrable Instances

Deferrable instances may be owned and transferred between users. Ownership can be recorded in a computer implemented database, such as the permanent memory of the resource manager 230. A first record ID number may be assigned to a first user. A record in the database may comprise the record ID number and a number of deferrable instances of a given type owned by the first user and assigned to the record ID number.

The "type" of a deferrable instance may be defined by a technical specification and performance metric 252 and term 210 of the deferrable instance. When a deferrable instance is initiated, the resource manager can reduce the number of deferrable instances in said first user's record by 1. This can occur, for example, after a deferrable instance rejects a query for an additional deferrable instance and the resource manager assigns a current resource to the deferrable instance. The deferrable instance has been used and the number of deferrable instances available to the user is reduced by one.

A deferrable instance may be sold by a first user with a first record ID, to a second user with a second record ID. The deferrable instance may be sold for fiat currency, crypto currency or any other consideration. The sale may be a negotiated transaction or a transaction governed by a predefined exchange rate. The steps of a sale executed by the resource manager may comprise:
  a) store in said permanent memory:
    i) a first record ID assigned to a first user;
    ii) a first number of said deferrable instances associated with said first record ID;
    iii) a second record ID assigned to a second user;
    iv) a second number of said deferrable instances associated with said second record ID; and
    v) a database comprising an exchange rate of deferrable instances for a fiat currency;
  b) receive a confirmation of a payment amount of said fiat currency from said first user to said second user;
  c) determine by said exchange rate, a quantity of said deferrable instances equivalent to said payment amount of fiat currency;
  d) increase said first number of deferrable instances by said quantity; and
  e) reduce said second number of deferrable instances by said quantity.

The exchange rate may be negotiated by the first and second users in a market. The exchange rate may also be a published number. The published number may be based on a plurality of transactions on a market. The exchange rate may be updated periodically, such as once a second. Any update period may be used.

The data stored in the permanent memory may be retrieved from a blockchain ledger. A record of the transactions after they are carried out may then be stored as a block in the blockchain ledger to provide a current, independently verifiable, record of ownership of the deferrable instances. The blockchain ledger may be on any blockchain platform, such as Ethereum.

Overbooking of Resources

The cloud service provider 148 may be the second user. The cloud service provider may set the value of the second number of deferred instances in the second record ID based on the number of current and future resources that are available now or might be available in the future.

The second number may be greater than the actual number of current resources that are currently available. This is known as overbooking. The acceptable level of overbooking may be based on a forecast of how often and under what conditions users initiate their deferrable instances. The cloud service provider can, to a certain extent, control the rate at which users initiate their deferrable instances by the rate at which additional deferrable instances are provided to current owners of deferrable instances. If the rate is high enough and if users maintain their trust in the cloud service provider's ability to provide resources when users initiate deferrable instances in the future, then a number of users may elect to hold on to their deferrable instances for an indefinite period of time. Deferrable instances that are held indefinitely may be used as a type of currency where users exchange deferrable instances for other goods and services. Thus, the value of deferrable instances is backed by the specified computer-based resources that a user can initiate at any time.

Deferrable Instance Tokens

In order to use deferrable instances to purchase goods and services, the resource manager may comprise a machine, such as a printer, adapted to produce a first physical token comprising a unique identification number and an indication of a numerical quantity and/or type of deferrable instances in a physical, unalterable, and uncopiable form at least to a level of physicality, inalterability, and uncopiability of a bill of fiat currency. An exemplary method for producing said token is described in U.S. Pat. No. 5,393,099, "Anti-Counterfeiting Laminated Currency and Method of Making the Same". Said patent is incorporated herein by reference with specific reference to the holographic techniques described therein. Other suitable forms of tokens include magnetic stripe or smart cards (e.g. credit or debit cards) or any other token suitable for storing or transferring values of fiat currency.

Each physical token may represent a quantity of deferrable instances of a given type. The "type" of a deferrable instance may be defined by its technical specification and performance metric. A method for producing physical tokens may comprise:
  i) receive from a first user:
    1) a request to produce said first physical token; and
    2) an input of a numerical quantity of deferrable instances; and
    3) a record ID associated with a first number of deferrable instances;
  ii) verify that said first number associated with said first record ID is greater than said numerical quantity;
  iii) produce said physical token comprising said unique identification number and said indication of said numerical quantity; and
  iv) reduce said first number of said deferrable instances associated with said first record ID by said numerical quantity.

One or more of the unique identification number, quantity, and type of a deferrable instance may be embodied in the physical token in a physical, unalterable, and uncopiable form. The type of a physical token may comprise an indication of the cloud service provider providing the deferred instances. Thus, there may be markets and exchange rates for exchanging physical tokens issued by different cloud service providers.

As used herein, "physical, unalterable and uncopiable" means that the indications are at least as physical, unalterable, and uncopiable as indications on one or more of fiat currency, value storage cards (e.g. debit cards), crypto currency (e.g. bitcoin) or e-currency (e.g. mobile phone wallets). For example, holograms are currently considered to be uncopiable by standard copy machines. They are affixed to bills of fiat currency to make them resistant to counterfeiting. The technologies suitable for fiat currency, value storage cards, crypto currency or e-currency, therefore, can be used for deferrable instance tokens.

The resource manager 230 may alternatively or additionally comprise a machine for receiving deposits of tokens. The machine may be adapted to carry out the steps:
  i) receive into a receptacle:
    1) a first record ID; and
    2) a physical token comprising a unique identification number, a quantity and a type;
  ii) verify:
    1) said first record ID;
    2) said unique identification number indicated on said token;
    3) said numerical quantity indicated on said token; and
    4) said type indicated on said token;
  iii) securely store or destroy said physical token; and
  iv) increase said first number associated with said first record ID by said numerical quantity.

The technologies suitable for receiving currency deposits into automatic teller machines are suitable for receiving deferrable instance tokens.

The records associated with deferred instance token transactions can be stored by any secure means, such as blocks in a blockchain ledger. The SLAs for deferrable instances may also be stored in blocks in a blockchain. The SLAs may comprise smart contracts including executable code. The executable code may govern, for example, the acceptance or rejection of queries for additional deferrable instances as described above.

A means for storing transactions and/or SLAs is considered secure when it is at least as secure as means for storing transactions of fiat currency.

Alternative Embodiments

The embodiments of deferrable instances presented herein have been described with respect to the assignment of digital computer-based resources. The same embodiments may be applied to the assignment of other physical and service-based resources. These include quantum computer-based resources, molecular computer-based resources, telecommunication resources, energy resources, and labor resources or other resources that may be developed in the future.

The functionality of the resource managers described herein may be apportioned to separate physical devices. For example, the resource manager may comprise a server for executing the methods for assigning deferrable instances to current resources and a separate machine for producing physical tokens. All separate physical devices may be in digital communication with each other such as a server being in digital communication with a printer. Thus, the separate physical devices may act as a unitary device.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

We claim:

1. A permanent memory of a computer-based deferrable instance assigned to a user, said permanent memory comprising:
   a) a technical specification and performance metric that substantially matches a technical specification and performance metric of an original physical or virtual computer-based resource that was selected by a first user when said deferrable instance was established;
   b) a term; and
   c) a set of instructions which, when executed by a microprocessor of said deferrable instance, causes said deferrable instance to carry out the steps:
      i) transmit, at a current time, to a computer-based network resource manager, a request to transfer program data and/or execution instructions to one or more current physical or virtual computer-based resources for execution during a time step wherein:
         1) said one or more current physical or virtual computer-based resources has a technical specification and performance metric that meets or exceeds said technical specification and performance metric of said deferrable instance; and
         2) said time step has a duration of a unit time period;
      ii) receive, from said computer-based resource manager, a query comprising:
         1) a deferral period relative to said current time; and
         2) an assignment of an additional deferrable instance to said user wherein said additional deferrable instance:
            a) has substantially the same technical specification, performance metric and term as said deferrable instance; and
            b) may only be initiated after said deferral period;
      iii) accept or reject said query based on said deferral period relative to a deferral threshold;
      iv) upon an acceptance of said query:
         1) defer said request by said deferrable instance to transfer said program data and/or execution instructions to said one or more current physical or virtual computer-based resources until after said deferral period; and
         2) accept said assignment of said additional deferrable instance to said user; or
      v) upon a rejection of said query, transfer said program data and/or execution instructions to said one or more current physical or virtual computer-based resources for execution during said time step.

2. The permanent memory of said computer-based deferrable instance of claim 1 wherein:
   a) said performance metric stored in said permanent memory of said computer-based deferrable instance comprises one or more of:
      i) a clock speed of a CPU;
      ii) an MFLOP rating of a CPU;
      iii) a SPEC INT 2006 benchmark for a CPU;
      iv) a percent uptime; or
      v) a memory storage capacity.

3. The permanent memory of said computer-based deferrable instance of claim 1 which further comprises a unique identification number of said deferrable instance.

4. The permanent memory of said computer-based deferrable instance of claim 3 which further comprises a physical token and wherein said physical token further comprises said unique identification number of said deferrable instance.

5. The permanent memory of said computer-based deferrable instance of claim 1 wherein said user and said first user are different users.

6. The permanent memory of said computer-based deferrable instance of claim 1 which further comprises said program data and/or execution instructions.

7. The permanent memory of said computer-based deferrable instance of claim 6 wherein:
   a) said program data and/or execution instructions comprise:
      i) a set of initial conditions for a control volume;
      ii) a set of boundary conditions for said control volume;
      iii) a forecast time period for said control volume; and
      iv) computational fluid dynamic computer code to cause said one or more current physical or virtual computer-based resources to determine a flow field in said control volume over a course of said forecast time period based on said initial conditions and said boundary conditions; and
   b) said deferrable instance is configured to set said deferral threshold based at least in part on:
      i) a required minimum accuracy at an end of said forecast time period; and
      ii) said technical specification and performance metric of said one or more current physical or virtual computer-based resources.

8. The permanent memory of said computer-based deferrable instance of claim 7 wherein:
   a) said flow field is a weather pattern; and
   b) said forecast time period is 10 days or more.

9. The permanent memory of said computer-based deferrable instance of claim 6 wherein:
   a) said program data and/or execution instructions comprise:
      i) a set of ground truth data for object detection;
      ii) a neural net comprising a plurality of node weight parameters; and
      iii) neural net training computer code to cause said one or more current physical or virtual computer-based resources to determine optimal values of said node weight parameters; and
   b) said deferrable instance is configured to set said deferral threshold based at least in part on:
      i) a required minimum accuracy of said neural net; and
      ii) said technical specification and performance metric of said one or more current physical or virtual computer-based resources.

10. The permanent memory of said computer-based deferrable instance of claim 6 wherein:
   a) said program data and/or execution instructions comprise:
      i) a block content of a blockchain;
      ii) a current degree of difficulty and desired validation period associated with said blockchain; and
      iii) proof-of-work computer code to cause said one or more current physical or virtual computer-based resources to determine a nonce based on a hash of said nonce and said block content such that said hash is less than or equal to said degree of difficulty; and
   b) said deferrable instance is configured to set said deferral threshold based at least in part on:
      i) a required minimum execution time per hash to find said nonce in said desired validation period; and ii) said technical specification and performance metric of said one or more current physical or virtual computer-based resources.

\* \* \* \* \*